US012451599B2

(12) United States Patent
Bai

(10) Patent No.: US 12,451,599 B2
(45) Date of Patent: Oct. 21, 2025

(54) RADOME AND RADAR DEVICE USING THE SAME

(71) Applicant: Alpha Networks Inc., Hsinchu (TW)

(72) Inventor: Ta-Chuan Bai, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 109 days.

(21) Appl. No.: 18/523,955

(22) Filed: Nov. 30, 2023

(65) Prior Publication Data

US 2024/0405415 A1 Dec. 5, 2024

(30) Foreign Application Priority Data

May 31, 2023 (TW) ................................ 112120381

(51) Int. Cl.
*H01Q 1/40* (2006.01)
*H01Q 1/42* (2006.01)
*H01Q 9/04* (2006.01)

(52) U.S. Cl.
CPC ............. *H01Q 1/40* (2013.01); *H01Q 9/0485* (2013.01)

(58) Field of Classification Search
CPC .. H01Q 1/38; H01Q 1/40; H01Q 1/42; H01Q 15/08; H01Q 19/06; H01Q 9/04; H01Q 9/0485
See application file for complete search history.

(56) References Cited

U.S. PATENT DOCUMENTS 3,314,070 A * 4/1967 Youngren ................ H01Q 1/42 343/872
4,914,449 A * 4/1990 Fukuzawa .......... H01Q 21/0087 343/872
5,027,130 A * 6/1991 Akaba .................... H01Q 1/421 343/872
5,121,129 A 6/1992 Lee et al.
9,985,347 B2 5/2018 Renilson et al.
11,342,659 B2 * 5/2022 Wittmann ................ H01Q 1/32
11,380,983 B2 * 7/2022 Chen ...................... H01Q 1/422
11,581,653 B2 * 2/2023 Xu .......................... H01Q 1/42
2009/0047023 A1 2/2009 Pescod et al.
(Continued)

FOREIGN PATENT DOCUMENTS

CN 110380208 10/2019
CN 110444883 11/2019
CN 113228413 8/2021
(Continued)

OTHER PUBLICATIONS

Pengfei Zhang, Shuxi Gong and Raj Mittra,"Beam-Shaping Technique Based on Generalized Laws of Refraction and Reflection", IEEE Transactions on Antennas and Propagation., Feb. 2018.
(Continued)

*Primary Examiner* — Tho G Phan
(74) *Attorney, Agent, or Firm* — WPAT, PC

(57) ABSTRACT

A radome and a radar device using the radome are provided. The radome is made of a dielectric material. A thickness of the dielectric material is first increased and then decreased along a radial direction extending from a center to an outer edge of the radome. The radar device includes the radome and an antenna transmitting or receiving electromagnetic waves passing through the radome.

10 Claims, 7 Drawing Sheets

(56) References Cited

U.S. PATENT DOCUMENTS

2019/0326676 A1 10/2019 Suematsu

FOREIGN PATENT DOCUMENTS

| | | |
|---|---|---|
| CN | 113285235 | 8/2021 |
| GB | 2510885 | 8/2014 |
| JP | 409191212 | 7/1997 |

OTHER PUBLICATIONS

Zhengbin Wang, J. Shi and Jin-chang Chen, "High-Efficiency Electromagnetic Wave Controlling with All-Dielectric Huygens' Metasurfaces", International Journal of Antennas and Propagation., May 2015.
Taiwan Intellectual Property Office, "Office action", issued on Mar. 22, 2024.
European Patent Office , "European search report", issued on Apr. 26, 2024.

* cited by examiner

| Region | Thickness (mm) | Radius (mm) |
|---|---|---|
| 100 | 2.73 | 17.498 |
| 102 | 3.41 | 35.265 |
| 104 | 5.07 | 53.69 |
| 106 | 6.9 | 72.794 |
| 108 | 8.24 | 93.262 |
| 110 | 8.75 | 115.47 |
| 112 | 8.28 | 140.0 |
| 114 | 6.82 | 167.82 |
| 116 | 4.64 | 200.0 |
| 118 | 2.34 | 238.35 |

| Frequency | Peak gain (dBi) | HPBW (degree) |
| --- | --- | --- |
| 10.7GHz | 16.1 | 28.8 |
| 11.7GHz | 16.8 | 26.2 |
| 12GHz | 17.1 | 25.6 |
| 12.7GHz | 17.5 | 24.3 |

FIG. 5

| Frequency | Peak gain (dBi) | HPBW (degree) |
| --- | --- | --- |
| 10.7GHz | 12.7 | 45 |
| 11.7GHz | 13.3 | 42.3 |
| 12GHz | 13.7 | 40.8 |
| 12.7GHz | 14.9 | 33.2 |

FIG. 6

| Frequency | Peak gain (dBi) | HPBW (degree) |
|---|---|---|
| 10.7GHz | 16.1 | 28.3 |
| 11.7GHz | 16.8 | 26.2 |
| 12GHz | 17.1 | 25.7 |
| 12.7GHz | 17.5 | 24.4 |

FIG. 7

| Frequency | Peak gain (dBi) | HPBW (degree) |
|---|---|---|
| 10.7GHz | 12.6 | 45 |
| 11.7GHz | 13.7 | 41.1 |
| 12GHz | 13.8 | 40.4 |
| 12.7GHz | 14.7 | 34.9 |

FIG. 8

| Region | Thickness (mm) | Radius (mm) |
|---|---|---|
| 100 | 4.2 | 17.5 |
| 102 | 4.82 | 35.27 |
| 104 | 6.36 | 53.69 |
| 106 | 8.1 | 72.79 |
| 108 | 9.41 | 93.26 |
| 110 | 9.93 | 115.47 |
| 112 | 9.66 | 140.04 |
| 114 | 8.49 | 167.82 |
| 116 | 6.26 | 200.0 |
| 118 | 3.32 | 238.5 |

FIG. 9

| Frequency | Peak gain (dBi) | HPBW (degree) |
|---|---|---|
| 14 GHz | 16.9 | 26 |
| 14.25GHz | 17 | 25.6 |
| 14.5GHz | 17.2 | 25.2 |

FIG. 10

| Frequency | Peak gain (dBi) | HPBW (degree) |
|---|---|---|
| 14GHz | 14.7 | 35.2 |
| 14.25GHz | 14.2 | 36.3 |
| 14.5GHz | 14.2 | 35.5 |

FIG. 11

| Frequency | Peak gain (dBi) | HPBW (degree) |
|---|---|---|
| 14 GHz | 16.9 | 26.1 |
| 14.25GHz | 17 | 25.7 |
| 14.5GHz | 17.2 | 25.3 |

FIG. 12

| Frequency | Peak gain (dBi) | HPBW (degree) |
|---|---|---|
| 14GHz | 14.7 | 35.2 |
| 14.25GHz | 14.2 | 36.3 |
| 14.5GHz | 14.2 | 35.3 |

FIG. 13

RADOME AND RADAR DEVICE USING THE SAME

FIELD OF THE INVENTION

The present disclosure relates to a radome and a radar device using the radome, and particularly to a radome having a wavy surface and varying thickness and a radar device using the radome.

BACKGROUND OF THE INVENTION

The array antenna has advantages of compact size, high reliability and multibeam applicability. Hence, the array antenna is widely applied to various high-tech products. For example, a modern satellite usually adopts an array antenna as major antenna structure. However, the array antenna transmits and receives wireless signals through beams with a narrow beam width. The signals fallen outside the coverage of the narrow beam width are probably subject to signal distortion or loss. Therefore, when an array antenna is used to transmit signals, it is necessary to increase the quantity of ground stations or transmitting/receiving field of view to ensure good satellite communication in all weathers. Nevertheless, the technology of increasing either of the quantity and the transmitting/receiving field of view of the ground stations requires much money or manpower. Therefore, the problem indeed obstructs the development of satellite communication.

SUMMARY OF THE INVENTION

The disclosure provides a radome which can widen the beam width of the beams for wireless signals and a radar device using the radome. The beam width widened by the radome can enlarge the field of view of the radar device.

An aspect of the present disclosure provides a radome. The radome is made of a dielectric material. A thickness of the dielectric material is first increased and then decreased along a radial direction extending from a center to an outer edge of the radome.

In an embodiment, the radome has a first outer surface and a second outer surface opposite to each other. The first outer surface is a flat surface and the second outer surface first gets farther from the first outer surface and then gets closer to the first outer surface along the radial direction extending from the center to the outer edge of the radome. Further, the second outer surface could show stepwise changes.

Another aspect of the present disclosure provides a radar device including an antenna and a radome. There is a predetermined distance between the antenna and a center of the radome. The antenna transmits or receives electromagnetic waves passing through the radome. The radome is made of a dielectric material. A thickness of the dielectric material is first increased and then decreased along a radial direction extending from the center to an outer edge of the radome.

In an embodiment, the radome has a first outer surface and a second outer surface opposite to each other. The first outer surface is a flat surface and the second outer surface first gets farther from the first outer surface and then gets closer to the first outer surface along the radial direction extending from the center to the outer edge of the radome. Further, the second outer surface could show stepwise changes. The first outer surface faces towards the antenna.

According to the present disclosure, the radome has a wavy surface and varying thickness to adjust the phase retardation of electromagnetic waves emitted to the radome. The electromagnetic waves emitted to different portions of the radome are refracted with different refraction angles to achieve divergence effect. Therefore, if a radar device adopts the radome of the present disclosure, the electromagnetic waves passing through the random diverge due to the widened beam width. Hence, the radar device has larger transmission coverage during transmission of the electromagnetic waves, and has a larger receiving angle during reception of the electromagnetic waves.

BRIEF DESCRIPTION OF THE DRAWINGS

The advantages of the present disclosure will become more readily apparent to those ordinarily skilled in the art after reviewing the following detailed description and accompanying drawings, in which:

FIG. 5 shows peak gain and half-power beam width of an antenna without using the radome of the present disclosure wherein the data are measured in the TE mode.

FIG. 6 shows peak gain and half-power beam width of a radar device including the radome in FIG. 4 and the antenna in FIG. 5 wherein the data are measured in the TE mode.

FIG. 7 shows peak gain and half-power beam width of the antenna without using the radome of the present disclosure wherein the data are measured in the TM mode.

FIG. 8 shows peak gain and half-power beam width of the radar device including the radome in FIG. 4 and the antenna in FIG. 5 wherein the data are measured in the TM mode.

FIG. 9 shows design parameters of a radome according to another embodiment of the present disclosure.

FIG. 10 shows peak gain and half-power beam width of an antenna without using the radome of the present disclosure wherein the data are measured in the TE mode.

FIG. 11 shows peak gain and half-power beam width of a radar device including the radome in FIG. 9 and the antenna in FIG. 10 wherein the data are measured in the TE mode.

FIG. 12 shows peak gain and half-power beam width of the antenna without using the radome of the present disclosure wherein the data are measured in the TM mode.

FIG. 13 shows peak gain and half-power beam width of the radar device including the radome in FIG. 9 and the antenna in FIG. 10 wherein the data are measured in the TM mode.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
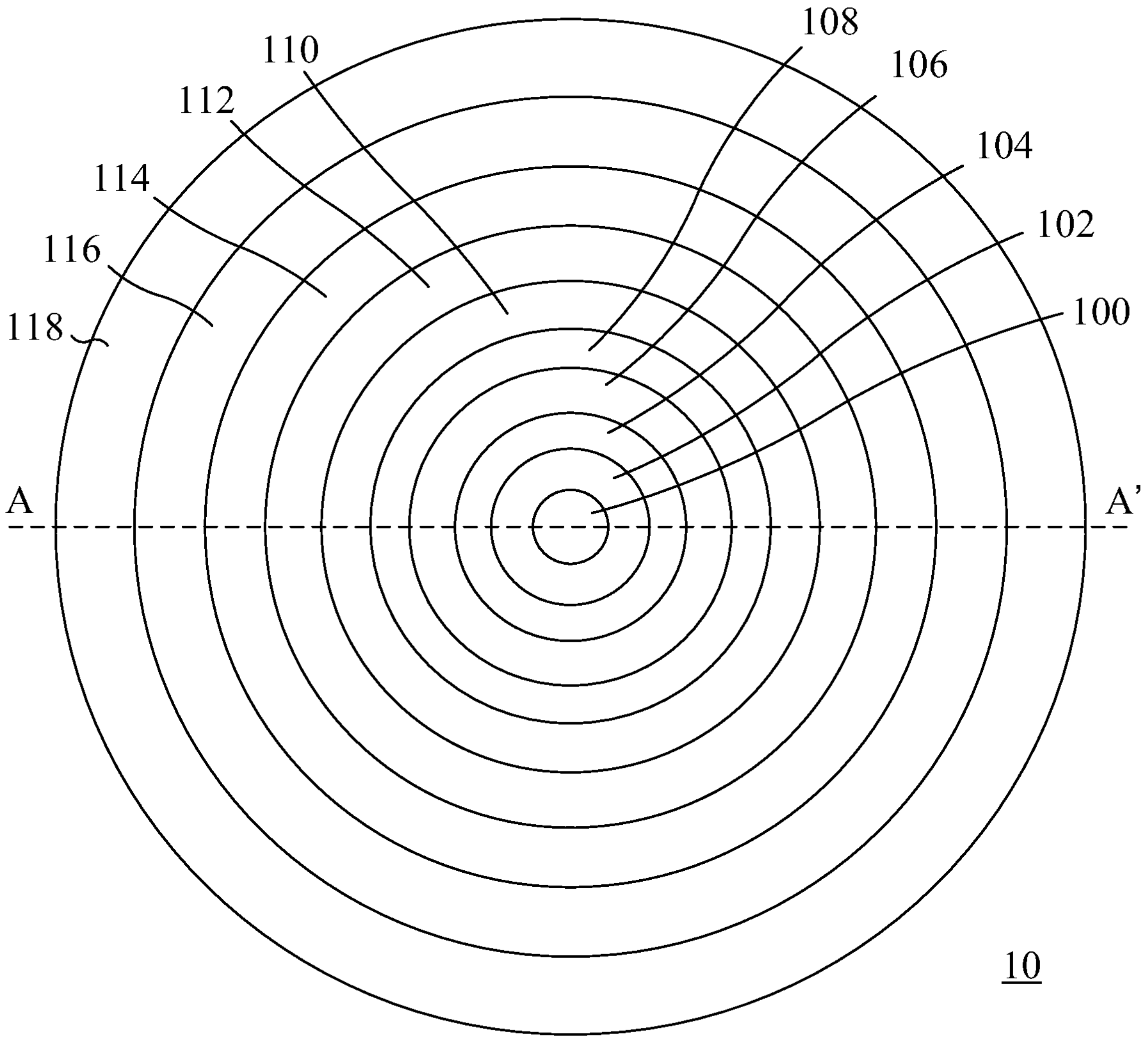
FIG. 1 is a top view of a radome according to an embodiment of the present disclosure.
Figure 2:
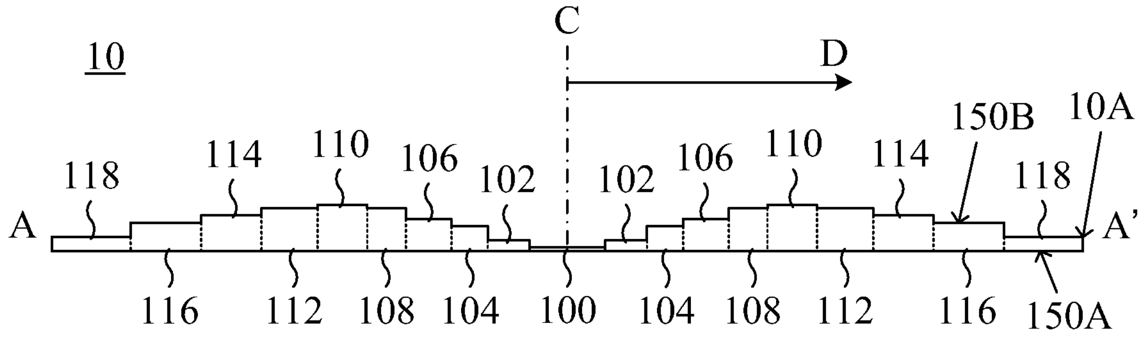
FIG. 2 is cross-sectional view of the radome along the line AA' of FIG. 1.

Please refer to FIG. 1 and FIG. 2, wherein FIG. 1 is a top view of a radome according to an embodiment of the present disclosure, and FIG. 2 is cross-sectional view of the radome along the line AA' of FIG. 1. In the embodiment, the radome 10 is integrally formed of a single dielectric material, and includes a central region 100 and several annular regions 102~118. For illustration purposes, imagined boundaries are shown between any two adjacent regions, but the regions are not actually separate from each other. As shown in the diagram, the central region 100 is located at the center of the radome 10, the annular region 102 is immediately adjacent to and surrounds the central region 100, the annular region 104 is immediately adjacent to and surrounds the annular region 102, the annular region 106 is immediately adjacent to and surrounds the annular region 104, the annular region 108 is immediately adjacent to and surrounds the annular region 106, the annular region 110 is immediately adjacent to and surrounds the annular region 108, the annular region 112 is immediately adjacent to and surrounds the annular region 110, the annular region 114 is immediately adjacent to and surrounds the annular region 112, the annular region 116 is immediately adjacent to and surrounds the annular region 114, and the annular region 118 is immediately adjacent to and surrounds the annular region 116.

For widening the beam width of the electromagnetic waves passing through the radome to increase divergence, the present disclosure adjusts the thickness of the radome which is first increased and then decreased along the radially outward direction D (i.e. along a radial direction extending from a center C to the circumference 10A of the radome 10). As shown in FIG. 2, in the section between the central region 100 and the annular region 110, the radome 10 becomes thicker and thicker along the radially outward direction D. Concretely, the annular region 102 is thicker than the central region 100, the annular region 104 is thicker than the annular region 102, the annular region 106 is thicker than the annular region 104, the annular region 108 is thicker than the annular region 106, and the annular region 110 is thicker than the annular region 108. On the other hand, in the section between the annular region 110 and the annular region 118, the radome 10 becomes thinner and thinner along the radially outward direction D. Concretely, the annular region 112 is thinner than the annular region 110, the annular region 114 is thinner than the annular region 112, the annular region 116 is thinner than the annular region 114, and the annular region 118 is thinner than the annular region 116. In other words, the thickest portion is an annular block located between the center C and the circumference 10A of the radome 10, and the radome 10 gets thinner and thinner from the thickest portion towards the center C and the circumference 10A of the radome 10, respectively.

In an embodiment, to form the radome 10 having the varying thickness as described above, the thickness of the radome 10 is adjusted by forming the radome 10 having an outer surface 150A (called the first outer surface hereinafter) and another outer surface 150B (called the second outer surface hereinafter) opposite to the first outer surface 150A with special design. Concretely, the first outer surface 150A is a flat surface and the second outer surface 150B is an undulant surface corresponding to the thickness distribution as described above. Hence, it could be observed from FIG. 2 that in the section between the central region 100 and the thickest annular region 110, the second outer surface 150B gets farther from the first outer surface 150A when the corresponding distance between the center and the annular region of the radome 10 is longer. By contrast, in the section between the thickest annular region 110 and the annular region 118, the second outer surface 150B gets closer to the first outer surface 150A when the corresponding distance between the center and the annular region of the radome 10 is longer. The second outer surface 150B may show stepwise changes or gradual changes.

It is to be noted that although the above embodiment adopts the flat surface 150A and the stepwise surface 150B to adjust the thicknesses of the annular regions of the radome 10, modifications could be made to the embodiment to provide the radome 10 having desired varying thickness. For example, both outer surfaces of the radome 10 are stepwise surfaces in appearance. Such design is applicable without adverse effect. Further, the size and quantity of the regions (e.g. regions 100~118) of the radome 10 are not limited to the embodiment and are adjustable to meet different requirements. Such adjustment involved in the design requires calculation of the parameters of respective regions, but makes the applications feasible. Furthermore, the circular radome described in the embodiment is just for illustration, but does not limit the shape of the radome. In principle, the thickness of the radome is first increased and then decreased along a radial direction extending from the center to the outer edge of the radome. The regions may be annular regions or not. In other words, the imagined boundaries shown between any two adjacent regions are in a shape of circle or not according to the shape of the radome.

To provide specific beam width to achieve desired divergence effect, the thickness of each region should be properly designed. The calculation is based on the generalized laws of refraction. At first, the angle of refraction of each region should be calculated to fit the desired divergence effect of the radome. Then, the phase retardation corresponding to the angle of refraction of each region is calculated. By substituting the phase retardation in the equations for the transverse electric (TE) mode and the transverse magnetic (TM) mode, the thickness of each region corresponding to the phase retardation is obtained. The related theoretical basis could refer to, for example, Pengfei Zhang, Shuxi Gong, and Raj Mittra, "Beam-Shaping Technique Based on Generalized Laws of Refraction and Reflection", IEEE Transactions on Antennas and Propagation, vol. 66, 771-779 (2018), and Zhengbin Wang, J. Shi, and Jin-chang Chen, "High-Efficiency Electromagnetic Wave Controlling with All-Dielectric Huygens' Metasurfaces", International Journal of Antennas and Propagation, 2015, 1-7.

Figures 3, 4:
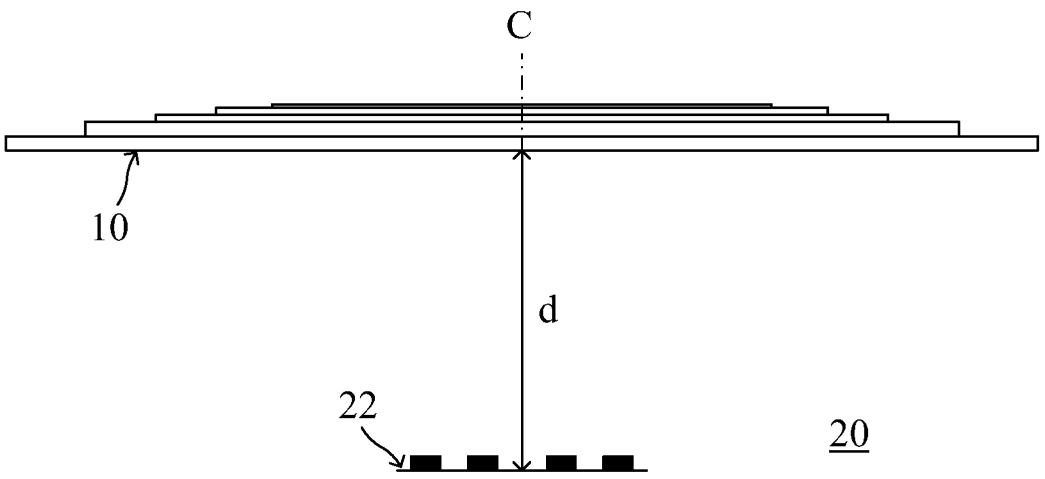
FIG. 3 is a schematic diagram illustrating a radar device according to an embodiment of the present disclosure.
FIG. 4 shows design parameters of a radome according to an embodiment of the present disclosure.

Please refer to FIG. 3, which is a schematic diagram illustrating a radar device according to an embodiment of the present disclosure. In the embodiment, the radar device 20 includes an antenna 22 and the above described radome 10. The radome 10 is disposed above the antenna 22 with a distance d, and the antenna 22 transmits or receives the electromagnetic waves passing through the radome 10. It is known that the thickness of each region of the radome 10 further depends on the dielectric material of the radome 10 and the frequency of the electromagnetic waves received or transmitted through the radome 10. The obtained parameters are given below for reference.

In an embodiment, the radome 10 is designed to cooperate with the antenna 22 for Ku band receiver at the frequency range of 10.7 GHz~12.7 GHz. In this embodiment, the radome 10 is made of a dielectric material having a dielectric constant about 2.72. The first outer surface 150A of the radome 10 faces towards the antenna 22 and the radome 10 is disposed at 20 cm above the antenna 22.

An example of the design parameters of the radome 10 obtained from the above concepts is shown in FIG. 4. The radius indicates that the longest distance between the region and the center of the radome 10. For example, the central region 100 is a circular block being concentric with the radome 10 and having a radius of 17.498 mm and a thickness of 2.73 mm; and the annular region 102 is an annular block being concentric with the radome 10 and having an outer radius of 35.265 mm, an inner radius of 17.498 mm and a thickness of 3.41 mm; the annular region 104 is an annular block being concentric with the radome 10 and having an outer radius of 53.69 mm, an inner radius of 35.265 mm and a thickness of 5.07 mm, and so forth. The configurations of other similar regions can be derived from FIG. 4, and need not be further described herein.

Please refer to FIGS. 5~8, wherein FIG. 5 shows peak gain and half-power beam width (HPBW) of an uncovered antenna measured in the TE mode; FIG. 6 shows peak gain and half-power beam width of a radar device, including the radome in FIG. 4 and the antenna in FIG. 5, measured in the TE mode; FIG. 7 shows peak gain and half-power beam width of the uncovered antenna measured in the TM mode; and FIG. 8 shows peak gain and half-power beam width of the radar device, including the radome in FIG. 4 and the antenna in FIG. 5, measured in the TM mode. It is observed from the data in FIGS. 5~8 that compared to the uncovered antenna 22, the half-power beam width of the radar device 20 in this embodiment is increased significantly. Hence, the radome of the present disclosure indeed increases the beam width of the electromagnetic waves to achieve divergence effect.

In another embodiment, the radome 10 is designed to cooperate with the antenna 22 for Ku band transmitter at the frequency range of 14 GHz~14.5 GHz. In this embodiment, the radome 10 is also made of a dielectric material having a dielectric constant about 2.72. Similarly, the first outer surface 150A of the radome 10 faces towards the antenna 22 and the radome 10 is disposed at 20 cm above the antenna 22.

An example of the design parameters of the radome 10 obtained from the above concepts is shown in FIG. 9. The meaning of the parameters is similar to those described in the embodiment with reference to FIG. 4, and needs not be further explained. FIGS. 10 and 12 show peak gain and half-power beam width of the electromagnetic waves emitted by the uncovered antenna; and FIGS. 11 and 13 show peak gain and half-power beam width of the electromagnetic waves emitted by the radar device including the radome in FIG. 9 cooperating with the same antenna used in FIGS. 10 and 12. Similarly, it is observed from the data in FIGS. 10~13 that compared to the uncovered antenna 22, the half-power beam width of the radar device 20 in this embodiment is increased significantly. Hence, the radome of the present disclosure indeed increases the beam width of the electromagnetic waves to achieve divergence effect.

In conclusion, the radome of the present disclosure has a wavy surface and varying thickness to adjust the phase retardation of electromagnetic waves emitted to the radome. The electromagnetic waves emitted to different portions of the radome are refracted with different refraction angles to achieve divergence effect. Therefore, if a radar device adopts the radome of the present disclosure, the electromagnetic waves passing through the random diverge due to the widened beam width. Hence, the radar device has larger transmission coverage during transmission of the electromagnetic waves, and has a larger receiving angle during reception of the electromagnetic waves.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A radome made of a dielectric material, wherein a thickness of the dielectric material is first increased and then decreased along a radial direction extending from a center to an outer edge of the radome, wherein the radome has a first outer surface and a second outer surface opposite to each other, the first outer surface being a flat surface and the second outer surface first getting farther from the first outer surface and then getting closer to the first outer surface along the radial direction extending from the center to the outer edge of the radome.

2. The radome according to claim 1, wherein the second outer surface shows stepwise changes.

3. The radome according to claim 1, wherein the radome includes a plurality of annular blocks concentric with the radome wherein any two adjacent annular blocks have different thicknesses and arrangement of the annular blocks widens a beam width of electromagnetic waves passing through the radome.

4. A radar device comprising:

an antenna; and a radome made of a dielectric material and including a plurality of annular blocks concentric with the radome wherein any two adjacent annular blocks have different thicknesses to form the radome with a thickness being first increased and then decreased along a radial direction extending from a center to an outer edge of the radome, and arrangement of the annular blocks widens a beam width of electromagnetic waves passing through the radome, wherein there is a predetermined distance between the antenna and the center of the radome, and the antenna transmits or receives the electromagnetic waves passing through the radome.

5. The radar device according to claim 4, wherein the radome has a first outer surface and a second outer surface opposite to each other, wherein the first outer surface is a flat surface and the second outer surface first gets farther from the first outer surface and then gets closer to the first outer surface along the radial direction extending from the center to the outer edge of the radome.

6. The radar device according to claim 5, wherein the second outer surface shows stepwise changes.

7. The radar device according to claim 5, wherein the first outer surface faces towards the antenna.

8. A radome made of a dielectric material and including a plurality of annular blocks concentric with the radome wherein any two adjacent annular blocks have different thicknesses to form the radome with a thickness being first increased and then decreased along a radial direction extending from a center to an outer edge of the radome, and arrangement of the annular blocks widens a beam width of electromagnetic waves passing through the radome.

9. The radome according to claim 8, wherein the radome has a first outer surface and a second outer surface opposite to each other, wherein the first outer surface is a flat surface and the second outer surface first gets farther from the first outer surface and then gets closer to the first outer surface along the radial direction extending from the center to the outer edge of the radome.

10. The radome according to claim 9, wherein the second outer surface shows stepwise changes.

* * * * *